United States Patent
McHardy et al.

Patent Number: 5,426,976
Date of Patent: Jun. 27, 1995

[54] METHOD AND APPARATUS FOR DETECTING THE POSITION OF LIQUID-LIQUID INTERFACES

[75] Inventors: John McHardy, Westlake Village; Thomas P. Moser, Redondo Beach, both of Calif.

[73] Assignee: Hughes Aircraft Company, Los Angeles, Calif.

[21] Appl. No.: 203,735

[22] Filed: Feb. 28, 1994

Related U.S. Application Data

[63] Continuation of Ser. No. 909,481, Jul. 6, 1992.

[51] Int. Cl.⁶ ............................................. G01F 23/14
[52] U.S. Cl. ...................................................... 73/299
[58] Field of Search ................. 73/299, 300, 301, 302, 73/303, 64.51, 64.55, 439, 61.44, 61.47, 61.78

[56] References Cited

U.S. PATENT DOCUMENTS

| | | | |
|---|---|---|---|
| 3,023,619 | 3/1962 | Sandford | 73/299 |
| 3,287,263 | 11/1966 | Johnson et al. | 73/299 |
| 3,426,584 | 2/1969 | Smith | 73/439 |
| 4,073,310 | 2/1978 | Mikule et al. | 137/389 |
| 4,084,435 | 4/1978 | Weik et al. | 73/299 |
| 4,102,190 | 7/1978 | Fradeneck et al. | 73/302 |
| 4,299,116 | 11/1981 | Baillie et al. | 73/30 |
| 4,393,705 | 7/1983 | Eidschun | 73/439 |
| 4,419,893 | 12/1983 | Baillie et al. | 73/439 |
| 4,422,326 | 12/1983 | Sasaki | 173/291 |
| 4,526,035 | 7/1985 | Auchapt et al. | 73/439 |
| 4,669,309 | 6/1987 | Cornelius | 73/299 |
| 4,719,799 | 1/1988 | Wicks et al. | 73/302 |

FOREIGN PATENT DOCUMENTS 57-175921  10/1982  Japan ............................. G01F 23/16

OTHER PUBLICATIONS

"Electrolytic Removal of Magnesium from Scrap Aluminum" *Journal of Metals*, vol. 36, No. 7, Jul., 1984 pp. 141–143.

"Electrolytics Demagging of Secondary Aluminum in a Prototype Furnace" *AFC Transactions*, vol. 94, pp. 385–390 (1986).

Lewis S. Goldmann et al, "Measurement of solder flux vapor surface tension by a modified maximum bubble pressure technique", *Review of Scientific Instruments* vol. 47, No. 3, Mar. 1976, pp. 324–326.

*Primary Examiner*—William A. Cuchlinski, Jr.
*Assistant Examiner*—Willie Morris Worth
*Attorney, Agent, or Firm*—M. E. Lachman; M. W. Sales; W. K. Denson-Low

[57] ABSTRACT

Precise information about the position of a liquid-liquid interface (28, 32) is often important for the control and automation of molten metal refining processes. For example, in an electrolytic process for removing magnesium from molten aluminum, knowledge of the vertical position of an interface (32) between the electrolyte and the magnesium and an interface (28) between the electrolyte and the aluminum facilitates the automatic removal of the purified metals. Differences in surface tension in the fluid layers of a molten electrolytic salt (30) and a molten metal (29) produce different pressures as bubbles (57) evolved from vertically displaced tips (52) of tubes (34, 36) press against the liquid layers on either side of their interfaces (28, 32). These different pressures are detected by a differential pressure transducer (42) to limit the amount of purified molten aluminum from molten aluminum-magnesium scrap, when drawn through a port (26) in a reaction furnace (10) without risk of also contaminating the purified aluminum with the electrolyte (30) above the interface.

8 Claims, 4 Drawing Sheets

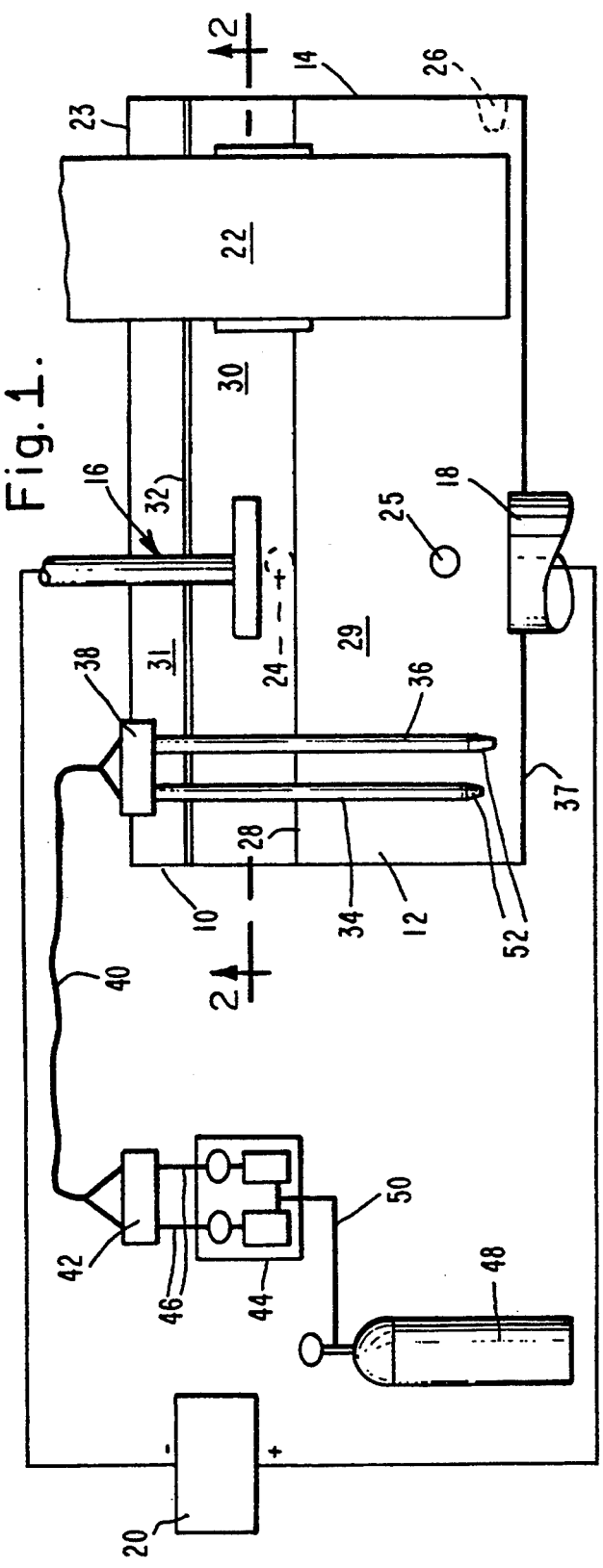
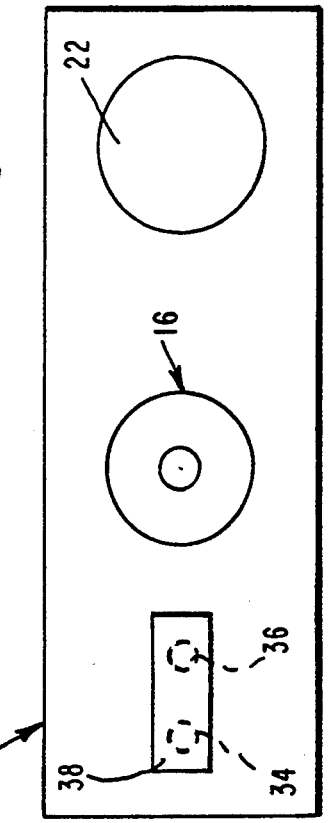
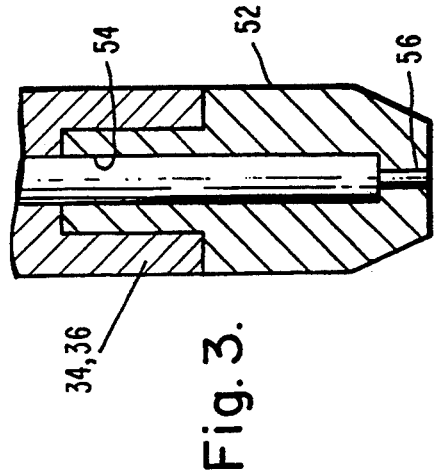

METHOD AND APPARATUS FOR DETECTING THE POSITION OF LIQUID-LIQUID INTERFACES

This is a continuation of application Ser. No. 07/909,481, filed Jul. 6, 1992, now abandoned.

BACKGROUND OF THE INVENTION

1. Field of the Invention

The present invention relates to a method and apparatus for detecting the position of liquid-liquid interfaces and, more particularly, to the effecting of such a method and apparatus by use of non-electrical detection means. The present invention is suitable for use in the refining of molten metals with specific application to the removal of magnesium from scrap aluminum.

2. Description of Related Art and Other Considerations

Although the impetus for conceiving the present invention is to provide process control in molten metal technologies, specifically, in a process for refining scrap aluminum, it is to be understood that the present invention is as applicable to any need for detecting the position of liquid-liquid interfaces by non-electrical means.

The removal of magnesium from scrap aluminum has been discussed in several publications, of which the following two are of particular interest to the present invention, viz., "Electrolytic Removal of Magnesium from Scrap Aluminum" *JOURNAL OF METALS,* Vol. 36, No. 7, July, 1984 pp. 141–43, and "Electrolytic Demagging of Secondary Aluminum in a Prototype Furnace" *AFS Transactions,* Vol. 94, pp. 385–390 (1986). The following excerpt from the latter article well states the reasons and background for recovering aluminum from scrap.

"The amount of aluminum in an automobile has steadily increased from an average of 40 kg in 1976 to an average of 60 kg in 1982 due to efforts to achieve higher fuel efficiency by lowering the overall weight of the vehicle. Therefore, for a constant supply of aluminum at minimum cost, casting producers may consider increasing the use of high magnesium scrap, with large potential savings over the purchase of primary aluminum. However, to conform with specifications, the production of casting alloys such as 319 from high magnesium aluminum scrap would require the removal of magnesium in excess of 0.1 wt.%. A chlorination process is most widely used by secondary smelters for demagging casting alloys. In this process, magnesium is selectively oxidized by chlorine and removed from molten aluminum in the form of a magnesium chloride dross. While the process is reasonably efficient at high magnesium content, it may create unacceptable environmental conditions in the plant. In addition, magnesium is being lost in the form of $MgCl_2$ dross, which being hygroscopic may pose disposal problems."

"Recognizing the need for an efficient and pollution-free demagging process, we have been developing the electrochemical process described in this paper. This process recovers magnesium in the form of salt-coated globules and apparently causes no environmental problems. The process . . . consists of covering the molten aluminum scrap with an electrolyte (a mixture of alkali and alkaline earth metal halides) and passing a current between molten aluminum acting as an anode and inert cathode dipped into the electrolyte. On applying a voltage between the electrodes, magnesium (being more reactive) dissolves first in the electrolyte from the aluminum melt, and concurrently deposits on the cathode. Because of its lower density, magnesium floats on the electrolyte and, thus, it is separated from the aluminum."

Inasmuch as the reaction vessel utilized in this demagging process contains three liquid layers comprising a top layer of magnesium, a middle layer of salt-electrolyte and a bottom layer of aluminum, operators need to monitor the levels of each layer during the addition or removal of metal. In particular, precise information about the electrolyte-metal interfaces is required to permit the removal of purified aluminum from the vessel without its being contaminated with the molten salt.

In the equipment described in the above-referenced *AFS Transactions* publication, the problem of aluminum removal was solved by utilizing two vertically placed drain holes, similar to holes 25 and 26 herein shown in FIG. 1. As the purified aluminum was drained from the reaction furnace into separate collection vessels, the electrolyte appeared at the upper drain hole, at which point the draining process was stopped to prevent any electrolyte from draining through the lower hole. The procedure was inconvenient to use and would be difficult to automate.

SUMMARY OF THE INVENTION

The present invention successfully provides the necessary process control information in an easier and more dependable manner. The position of an interface between liquids, such as between the molten aluminum and the electrolyte, which respectively have different coefficients of surface tension, is detected by sensing a change in the surface tensions at the interface.

In one embodiment, a tube is lowered into the melt and the pressure, which is required to generate a bubble at the tip, is measured. When the lid passes through the interface of two fluids, the bubble pressure changes abruptly, reflecting the different surface tensions of the fluids. This change in the bubble pressure defines the position of the interface. Alternatively, the tip may be positioned slightly above the point where purified aluminum, or other liquid or fluid of interest, is to be removed. It is then possible to detect the upper surface of the fluid prior to its dropping to the removal point. Thus, the removal of any contaminants near or above the interface is avoided.

A more sensitive embodiment employs two tubes of slightly different lengths. By coupling the tubes to a differential pressure transducer, the difference in bubble pressure in the layers on either side of the interface can be perceived.

Several advantages are derived from the present invention. Precise measurements of liquid-liquid interfaces are obtainable, particularly without requiring the use of electrical measuring means, to preclude any electrical field from interfering with the sensing. Level sensing can be implemented in corrosive or other hostile environments. In a demagging process, removal of the purified aluminum and magnesium can be easily automated.

Other aims and advantages, as well as a more complete understanding of the present invention, will appear from the following explanation of an exemplary embodiment and the accompanying drawings thereof.

BRIEF DESCRIPTION OF THE DRAWINGS

FIG. 1 is view of apparatus utilized to electrochemically purify scrap aluminum by extracting magnesium from the scrap and, by use of the present invention, to detect liquid-liquid interfaces between an electrolyte and the molten aluminum and magnesium extracted from the scrap;

FIG. 2 is a view in cross-section taken along line 2—2 of FIG. 1;

FIG. 3 is a view in partial cross-section showing the capillary tip of one of the tubes illustrated in FIG. 1;

DETAILED DESCRIPTION OF THE PREFERRED EMBODIMENTS

Figure 4:
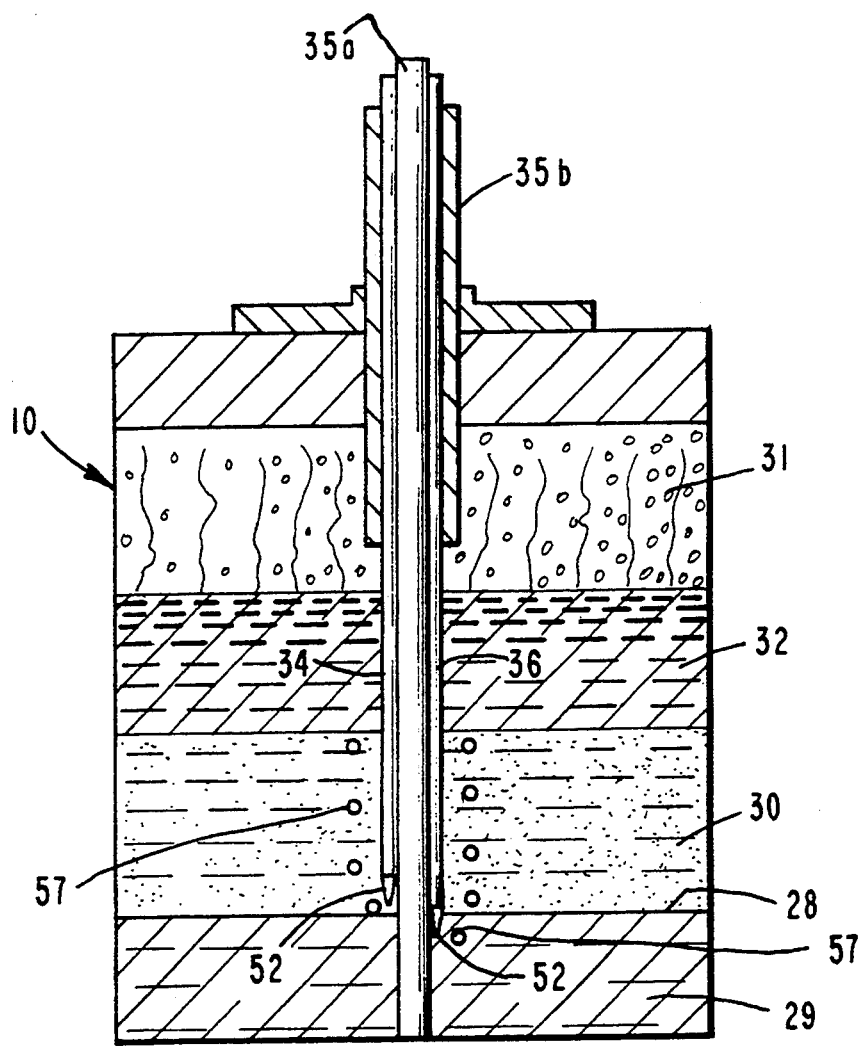
FIG. 4 and its cross-section in FIG. 4a are views in greater detail generally of a part of the apparatus depicted in FIG. 1, after a portion of the refined molten aluminum has been drawn for the reaction furnace, showing the two tubes, whose capillary tips are at different vertical levels and are now respectively positioned in the two liquid levels on either side of their interface, and how the arrangement can detect the different bubble pressures and, therefore, the existence and position of the interface.

As shown in FIG. 1, a fully sealed furnace or reaction vessel 10 provides a closed environment for the removal of magnesium from scrap aluminum and for enabling purified aluminum to be drawn from closed vessel 10. The working volume of furnace 10 is divided into a refining zone 12 and a heating/pouring zone 14. Positioned in refining zone 12 is a cathode 16 positioned above an anode 18. The cathode and anode are connected to a source of direct current 20. Preferably, cathode 16 is formed of mild steel, while anode 18 is formed of graphite. A heater 22 is positioned in heating-/pouring zone 14. A cover 23 in the otherwise closed top of vessel 10 is opened so that scrap aluminum in molten form may be placed into the furnace. Various holes 24, 25 and 26 are provided in furnace 10 and are closable by suitable means. Hole 24 is used as an electrolyte/separated magnesium drain, while holes 25 and 26 are used as egresses for removal of refined aluminum from the furnace. As will be discussed below, hole 25 may be dispensed with, as being useful in practicing the demagging process prior to implementation of the present invention.

In the operation of the process both prior to and after use of the present invention, and as more fully detailed in the two publications referred to above, scrap aluminum containing magnesium impurities in molten form is placed into heating/pouring zone 14 through the opening uncovered by cover 23, and thus within refining zone 12 to approximately the lowermost portion of hole 24, as designated generally by a level symbolized by line 28. Indicium 29 generally designates molten matter comprising either the molten scrap aluminum prior to purification or the purified aluminum obtained therefrom. An electrolyte 30 of calcium chloride, magnesium chloride, potassium chloride and sodium chloride is placed above the molten scrap aluminum to a depth sufficient at least partially to cover cathode 16. A space 31 is provided for an inert gas, for example, argon. Upon application of electrical energy, the magnesium is ionized and collected at the cathode, thereby forming a layer 32 of molten magnesium. After a suitable period of time, when the molten scrap aluminum is sufficiently purified of the magnesium impurities, one or both tap holes 25 and 26 are opened in order to draw off the purified aluminum.

Before use of the present invention and as discussed above, as the level of purified aluminum drops and the level of the electrolyte with impurities therein reaches tap hole 25, no further aluminum is drawn from furnace 10. Because tap hole 26 is positioned lower than tap hole 25, it is possible to separate the amount of pure aluminum drawn from the furnace at tap hole 26 as distinguished from tap hole 25. Therefore, in the process thus described, it has been possible to monitor the level which distinguished the interface between the pure and impure molten materials.

In the present invention, however, rather than utilizing a pair of tap holes 25 and 26 to determine the level at which impurities are discernable, the following non-electrical sensing system is utilized.

Figure 4A:
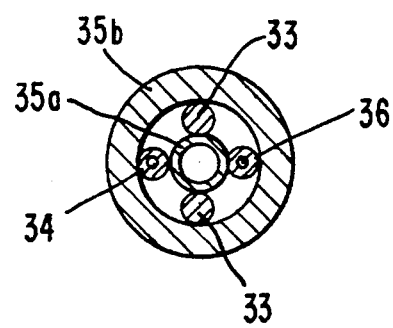

Referring also to FIGS. 4 and 4a, a pair of tubes 34 and 36 with capillary tips extend downwardly in furnace 10 towards its bottom 37 and, with a pair of spacers 33, are supported between inner and outer support tubes 35a and 35b. Depending upon the stage at which the process is being conducted, the tubes in FIG. 1 are positioned within refining zone 12 in molten matter 29, while in FIGS. 4 and 4a they are disposed about interface 28 after liquid aluminum has been drawn from furnace 10. Tubes 34 and 36 terminate at levels which are respectively generally level with tap hole 26 and where tap hole 25 would have been, if retained. Accordingly, tube 34 terminates at a level which is slightly higher than that of level 36. Tubes 34 and 36 extend upwardly to the top of furnace 10 where they terminate in a manifold 38. Gas lines or conduits 40 couple manifold 38 to a differential pressure transducer 42 which, in turn, is coupled to mass flow controllers 44 by conduits 46 and thence to a source of gas 48 by a conduit 50. Any inert gas may be employed, e.g., argon. Transducer 42 and controllers 44 are of conventional construction.

Both tubes 34 and 36 terminate in respective capillary tips 52, which can be best seen in FIG. 3. Because of the corrosive nature of the system, capillary tips 52 are formed of graphite, boron nitride, or any other suitable non-reactive material. As shown, each capillary tip is configured to reduce a bore 54 to a smaller bore 56. Bores 56 are sized to provide bubbles 57 of the smallest possible diameter, for reasons to be presently described. However, the size of bores 56 are not so small as to be likely to become clogged with one of the metals or salts. Should clogging nevertheless occur, such as through a build up of solids in the bore, when changing the pressure to force the inert gas through tubes 34 and 36, as would occur during the purification stage of the process, the electrolyte salt is permitted to wick up into bores 56 to remove the clogging solids.

The concept central to the present invention is based upon a measuring of the pressure required to generate a single gas bubble within a fluid. Since both hydrostatic and surface tension forces contribute to the bubble pressure, a step change in the bubble pressure is anticipated just at the interface of two fluids with significantly different surface tensions, such as occurs at the two molten salt/molten metal interfaces. The surface tension contribution is governed by a relationship known as the Laplace equation:

$$P_{in} - P_{out} = 2s/r,$$

where "$P_{in}$" is the pressure inside the bubble, "$P_{out}$" is the pressure outside the bubble, "s" is a coefficient known as a surface tension of the fluid, and "r" is the radius of the bubble. The Laplace equation suggests that the pressure inside a curved surface is always greater than the pressure outside, but the difference drops to zero as the radius of curvature becomes infinite, such as when the surface is flat. Because small bubbles have very small radii of curvature, the pressure across them is correspondingly large. Thus, small bubble radii are desired for the present invention, in order to increase the contribution of the surface tension portion of the bubble pressure relative to the hydrostatic portion.

Reference to FIGS. 4 and 4a, in conjunction with FIG. 1, is made to describe operation of the invention. As illustrated in FIG. 1, prior to commencing purification, tips 52 of both tubes 34 and 36 are positioned in the molten scrap aluminum which, at this point of the process, constitutes the composition of molten matter 29. At this point in the practice of the process, no gas is supplied through tubes 34 and 36. Upon supply of power to electrodes 16 and 18, magnesium is refined from the scrap aluminum and floats above molten salt 30 to its position identified by numeral 32 and, after a period of time, the molten scrap aluminum is converted into purified aluminum, which then constitutes the composition of molten matter 29.

After completion of the electrochemical refining process, when it is desired to draw the purified aluminum from refining zone 12, a small flow of inert gas is supplied to tubes 34 and 36, and tap hole 26 is opened, to permit the aluminum to be collected in a collection vessel. During this draining, the levels of aluminum layer 29, molten electrolytic salt layer 30 and molten magnesium layer 32 drop until interface 28 between the aluminum and electrolyte layers passes below tip 52 of tube 34. This permits bubbles 57 from tube 34 to pass into electrolyte layer 30. Because the coefficient of surface tension of the electrolyte is different from that of the aluminum, different bubble pressures are produced and are detected by differential pressure transducer 42, to inform the operator that no further aluminum is to be drawn from furnace 10. If desired, an automatic shut-off valve may be positioned between tap hole 26 and the aluminum collection vessel, and electrically coupled to transducer 42 for automatic shut-off of the aluminum flow.

Figure 5:
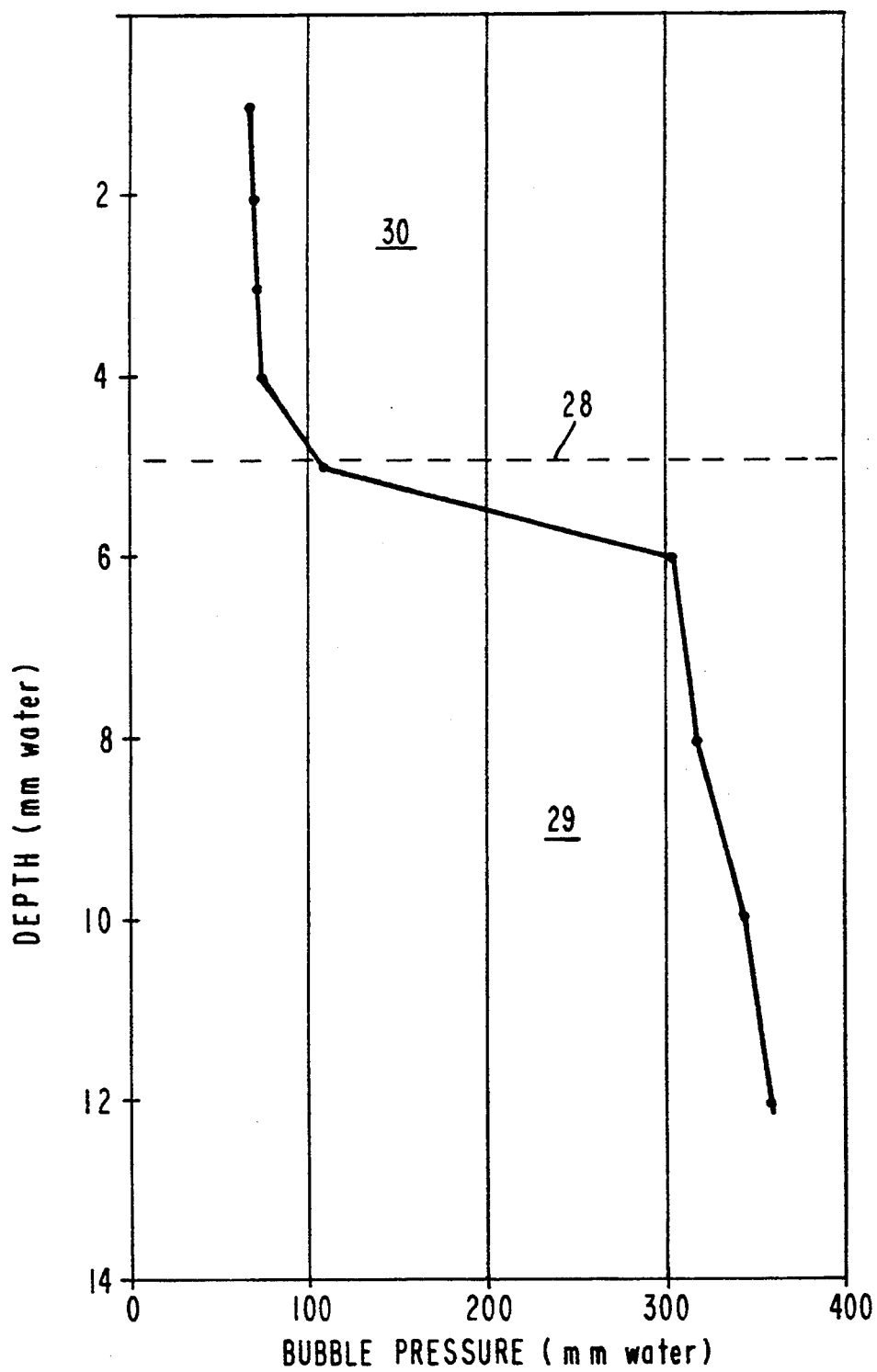
FIG. 5 graphically depicts the relationship of bubble pressure to liquid depth, particularly to reveal the interface between the two liquids which is thus precisely defined by a significant change in surface tension, thereby illustrating how the surface tension approach to level sensing concept is integral to the present invention.

An application test was run using a layered molten salt/molten aluminum system. The salt was composed of a mixture of 8% potassium chloride, 25% sodium chloride and 67% calcium chloride, on a mole percent basis, which melts at 540° C. The molten salt and molten aluminum were contained in heated graphite crucibles oriented vertically in a tube furnace at 628° C. A gentle purge of nitrogen gas was maintained within the tube furnace to prevent oxidation of the graphite at high temperature. The sensor probe was drawn from standard wall 6 mm quartz tubing to a tip diameter of 1.34 mm. In the application test, the quartz tube was lowered into the molten layers. As shown in FIG. 5, a significant step change in the bubble pressure occurred at the interface between the molten salt and the molten aluminum. The level of the interface was resolved to within ±1.0 mm.

Similar results were obtained in a prior experiment, utilizing a mercury-water combination and argon to generate the necessary bubble pressure. Tests, using both a straight tip and a U-shaped tip, clearly demonstrated the differences between the surface tensions of water and mercury and produced a considerable step change in bubble pressure over a very small change in tip depth. A graph of these results produced a step change which was similar to that shown in FIG. 5.

Figure 6:
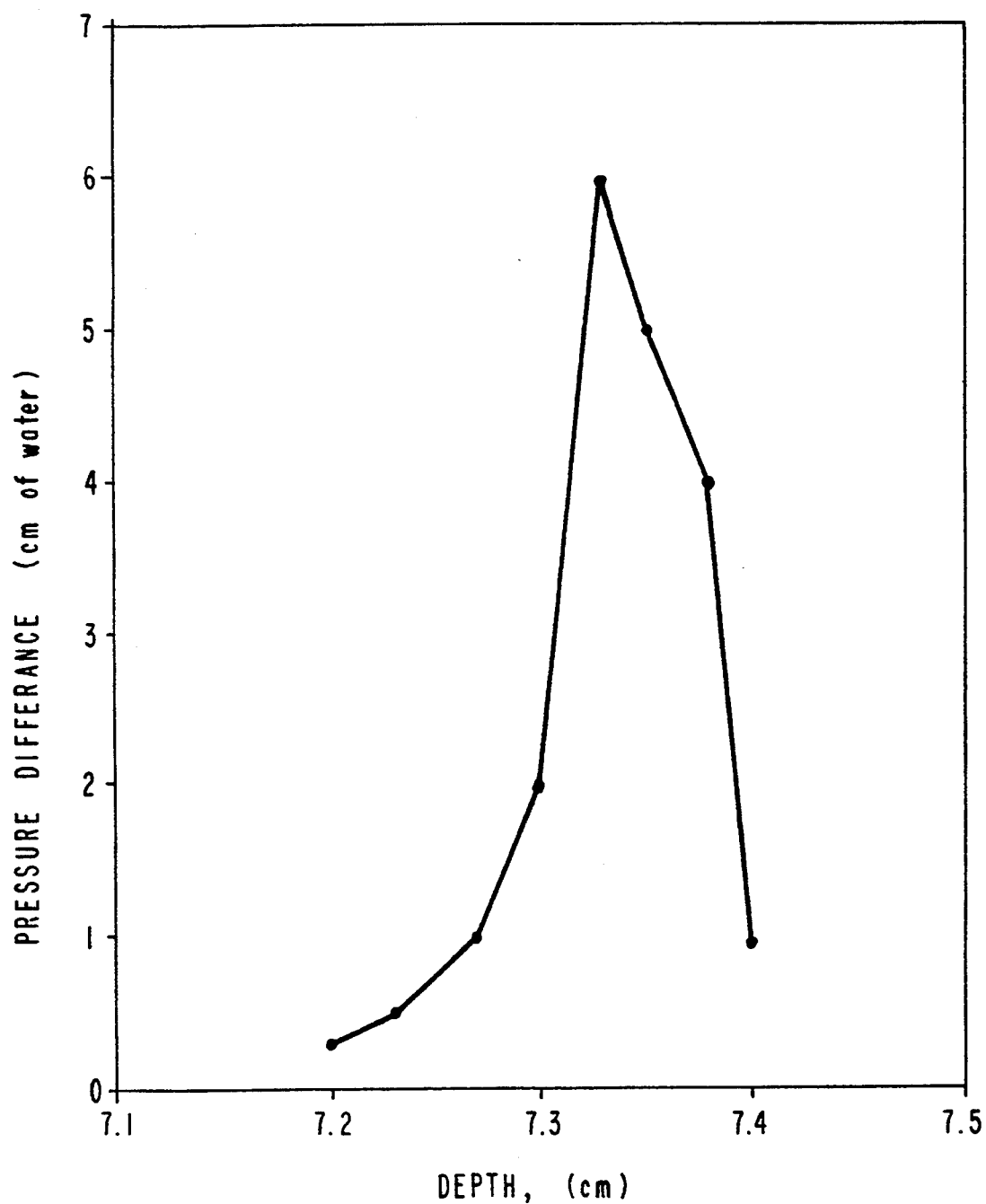
FIG. 6 graphically illustrates the relationship between liquid depth and bubble pressure difference to demonstrate how a well-defined differential pressure peak marks the liquid-liquid interface in the present invention.

The graph of FIG. 6 demonstrates the well-defined differential pressure peak which marks the liquid-liquid interface in accordance with the present invention.

Although the invention has been described with respect to a particular embodiment thereof, it should be realized that various changes and modifications may be made therein without departing from the scope of the invention.

What is claimed is:

1. A method for detecting the position of an interface between first and second liquids respectively having different coefficients of surface tension, comprising the steps of:
    (a) providing first and second capillary tubes, one longer than the other, and terminating in tips having apertures that are substantially the same size and less than about 6 millimeters in diameter;
    (b) positioning said tips of said first and second capillary tubes in said first and second liquids;
    (c) injecting an inert gas into said first and second capillary tubes simultaneously to form bubbles in the liquids;
    (d) measuring the pressure of the gas in each tube; and
    (e) detecting any difference in pressure from one tube to the other, wherein such difference indicates two liquids of different surface tension and hence the presence of the interface of said first and second liquids between the tips of said first and second capillary tubes.

2. A method according to claim 1 in which said bubbles are sized to have a radius of curvature to maximize the contribution of surface tension to the bubble pressure at the interface.

3. A method according to claim 1 further comprising moving one capillary tube and the interface with respect to one another to move the tip through the interface.

4. A method according to claim 3 in which said moving step comprises the step of changing the position of the interface with respect to the capillary tip by removal of at least one of the liquids.

5. Apparatus for detecting the position of an interface between first and second liquids respectively having different coefficients of surface tension, comprising:
    (a) first and second capillary tubes, one longer than the other, and terminating in tips having apertures that are substantially the same size and less than about 6 millimeters in diameter wherein said tips are positioned in said first and second liquids;
    (b) a source of inert gas;
    (c) means for injecting the gas into said first and second capillary tubes simultaneously to form bubbles in the liquids;

(d) means for measuring the pressure of the gas in each tube; and (e) means for detecting any difference in pressure from one tube to the other, wherein such difference indicates two liquids of different surface tension and hence the presence of the interface of said first and second liquids between the tips of said first and second capillary tubes.

6. Apparatus according to claim 5 in which said bubble is sized to have a minimum radius of curvature and a corresponding large contribution of surface tension to the bubble pressure at the interface.

7. Apparatus according to claim 5 further comprising means for changing the position of the interface with respect to the capillary tip.

8. Apparatus according to claim 5 wherein said means for detecting any difference in pressure further comprises a pressure transducer coupled to said means for injecting gas.

* * * * *